United States Patent [19]

Asano et al.

[11] Patent Number: 5,419,128
[45] Date of Patent: May 30, 1995

[54] METHOD OF CONTROLLING SPEED REDUCTION RATIOS OF CONTINUOUSLY VARIABLE TRANSMISSION FOR AUTOMOTIVE VEHICLES

[75] Inventors: Tetsushi Asano, Utsunomiya; Yoshihiro Katagiri, Kawachi; Mikihiro Takano, Utsunomiya, all of Japan

[73] Assignee: Honda Giken Kogyo Kabushiki Kaisha, Tokyo, Japan

[21] Appl. No.: 897,871

[22] Filed: Jun. 12, 1992

[30] Foreign Application Priority Data

Jun. 14, 1991 [JP] Japan .................. 3-169220

[51] Int. Cl.⁶ ............................................. F16D 31/00
[52] U.S. Cl. ........................................ 60/327; 60/431; 60/433; 60/487
[58] Field of Search ................. 60/487, 327, 431, 433, 60/434; 475/76, 80, 83

[56] References Cited

U.S. PATENT DOCUMENTS

| | | | |
|---|---|---|---|
| 3,139,723 | 7/1964 | Hollowell | 60/433 |
| 4,901,529 | 2/1990 | Iino et al. | 60/487 |
| 4,976,664 | 12/1990 | Hagin et al. | 475/80 |
| 5,193,416 | 3/1993 | Kanayama | 475/80 |

FOREIGN PATENT DOCUMENTS 54-35558 3/1979 Japan .
63-22737 1/1988 Japan .

OTHER PUBLICATIONS

English language Abstracts of JP 54-35558 and 63-22737.

*Primary Examiner*—F. Daniel Lopez
*Attorney, Agent, or Firm*—Lyon & Lyon

[57] ABSTRACT

In order to achieve a gear ratio control of a continuously variable transmission, a transmission gear ratio is controlled based on a difference between an actual engine speed and a target engine speed to be set in response to a first parameter corresponding to an accelerator opening. When controlling the transmission gear ratio, a plurality of change characteristics of the transmission gear ratio are set for, in particular, the kickdown gear shifting. In response to a second parameter representing the driver's demand for a traveling condition, a change characteristic of the transmission gear ratio is selected from among the plurality of change characteristics of the transmission gear ratio, to execute the speed ratio control in accordance with the thus selected change characteristic of the transmission gear ratio when a kickdown gear shifting is needed.

37 Claims, 8 Drawing Sheets

METHOD OF CONTROLLING SPEED REDUCTION RATIOS OF CONTINUOUSLY VARIABLE TRANSMISSION FOR AUTOMOTIVE VEHICLES

BACKGROUND OF THE INVENTION

1. Field of the Invention

The present invention relates to a method of controlling gear ratios (i.e., speed reduction ratios) of a continuously variable transmission in which transmission gear ratios are controlled based on a difference between an actual engine speed and a target engine speed to be set in response to an indicator representative of the driver's desire for acceleration or deceleration such as the amount of depression of the accelerator pedal, the opening of the engine throttle, or the like.

2. Description of the Related Arts

At the execution of such control of transmission gear ratios, the speed reduction ratio is so controlled that the actual engine speed is caused to approach the target engine speed. At that time, the magnitude of the rate of change in the transmission gear ratios, that is, gear shifting the speed must be appropriately set to obtain desired characteristics.

For this reason, there has been known a method of controlling gear ratios as disclosed in Japanese Patent Publication No. 59-44537 (Japanese Patent Laid-Open Publication No. 54-35558) in which the gear shifting speed is caused to change depending on the transmission gear ratio, and the larger the transmission gear ratio (=input engine speed/output engine speed), the more the gear shifting speed is increased. This aims to speed up the change in the transmission gear ratios to ensure a fully accelerating ability from a standstill.

Furthermore, Japanese Patent Laid-Open Publication No. 83-22737 discloses a method of controlling gear ratios in which the gear shifting speed is caused to change depending on the engine speed, and the higher the engine speed, the more the gear shifting speed is lowered. This aims to ensure a gear shifting response characteristic with respect to the operation of the accelerator pedal at a lower engine speed as well as realizing a gear shifting stability at a higher engine speed.

The above-described controlling device is constructed to perform a so-called kickdown gear ratio control by which the transmission gear ratio is increased (a shifting to lower gears takes place) when the target engine speed which is set in response to the depression of the accelerator pedal during the traveling is raised through the depression of the accelerator pedal.

The variation in engine speed, vehicular speed and the like which may be caused by this control will now be described with reference to a model shown in FIG. 11.

Figure 11:
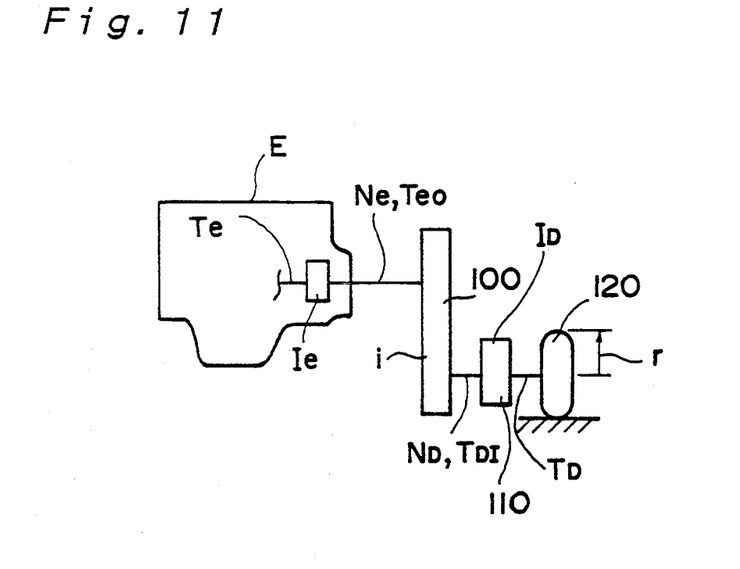
FIG. 11 is a schematic view showing a model of a power transmission system for automotive vehicles.

FIG. 11 diagrammatically shows a modelized automotive vehicle in which the output of an engine E is transmitted to wheels 120 by way of a power transmission system 100 including a continuously variable transmission.

Where an equivalent inertia weight of a rotator directly linked with an output shaft of the engine E, that is, of an engine system rotator is $I_e$, an output torque is $T_e$, and an output revolution of the engine is $N_e$, the output torque $T_{eo}$ produced when the accelerator pedal is depressed to increase the engine speed (which is referred to as engine transient torque) is expressed as:

$$T_{eo} = T_e - I_e \times dN/dt \quad (1)$$

In other words, the increase or decrease in the engine speed necessitates a torque ($I_e \times dN/dt$), and hence the actually obtained torque equals $T_{eo}$.

The output of the engine E is transmitted through the power transmission system 100 to the output shaft (or the axle). Then, let a reduction gear ratio of the power transmission system 100 be i, a torque $T_{DI}$ transmitted to the output shaft is expressed in view of the expression (1) as:

$$\begin{aligned} T_{DI} &= i \times T_{eo} \\ &= i \times T_e - i \times I_e \times dN/dt \end{aligned} \quad (2)$$

On the other hand, let the number of revolutions of the output shaft be $N_D$, with a relationship of $N = i \times N_D$, the following expression is obtained by differentiating N with respect to time.

$$dN/dt = N_D \times di/dt + i \times dN_D/dt \quad (3)$$

Here, let an equivalent inertia weight of the vehicular body including its associated members be $I_D$, the torque $T_D$ which will be actually transmitted to tires 120 from among the torque $T_{DI}$ transmitted to the output shaft as described above can be written as:

$$T_D = T_{DI} - I_D \times dN_D/dt \quad (4)$$

It should be noted that the above equivalent inertia weight includes not only that of the vehicular body, but also the wheels and their associated rotators (for example, tires, a brake drum, an accelerator shaft, etc.) and a final reduction gear input shaft and its associated rotators (for example, a transmission counter shaft, gears on the output side, a propeller shaft, etc.).

This torque $T_D$ acts to drive the tires 120 to thereby accelerate the automotive vehicle. Accordingly, providing that a weight of the automotive vehicle is W, a running resistance of the automotive vehicle is $f_{RL}$, and a rotational radius is r, then the acceleration $\alpha$ of the automotive vehicle is expressed as:

$$W = \alpha = T_D/r - f_{RL} \quad (5)$$

By substituting the above expression (4) for this expression (5), the following can be obtained.

$$W \times \alpha = (T_{DI} - I_D \times dN_D/dt)/r - f_{RL}$$

Furthermore, when substituting the expressions (2) and (3) for the just above expression, the result is:

$$W \times \alpha = i \times T_e/r - \{(I_e \times i^2/r + I_D/r) \times dN_D/dt + I_e \times i \times di/dt \times N_D\} - f_{RL}$$

Here, since $r \times N_D = V$ (vehicular speed) and $r = dN/dt = \alpha$(acceleration), the just above expression can be expressed in the form $$\{W + (I_e \times i^2 + I_D)/r^2\}\alpha = i \times T_e/r - (I_e \times i \times N_D/r) \times di/dt - f_{RL} \quad (6)$$

On replacing respective constant terms with A, B, C, etc., the result is:

$$A \times \alpha = B \times T_e - C \times di/dt - D \quad (7)$$

As is apparent from this expression (7), when effecting a kickdown gear shifting through the depression of the accelerator pedal, the engine torque Te is increased in accordance with the amount of the depression of the accelerator pedal. The acceleration is increased correspondingly to this increase of the engine torque, whereas the rate of change (di/dt) of the transmission gear ratio caused by the kickdown acts to decrease the acceleration $\alpha$.

Figure 9A:
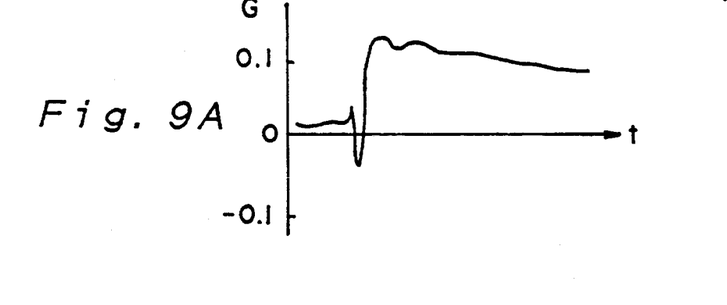
FIG. 9 is a graph illustrating the variations, correspondingly at the time of kickdown gear shifting, in the acceleration acting on the vehicular body and in the engine speed.
Figure 9B:
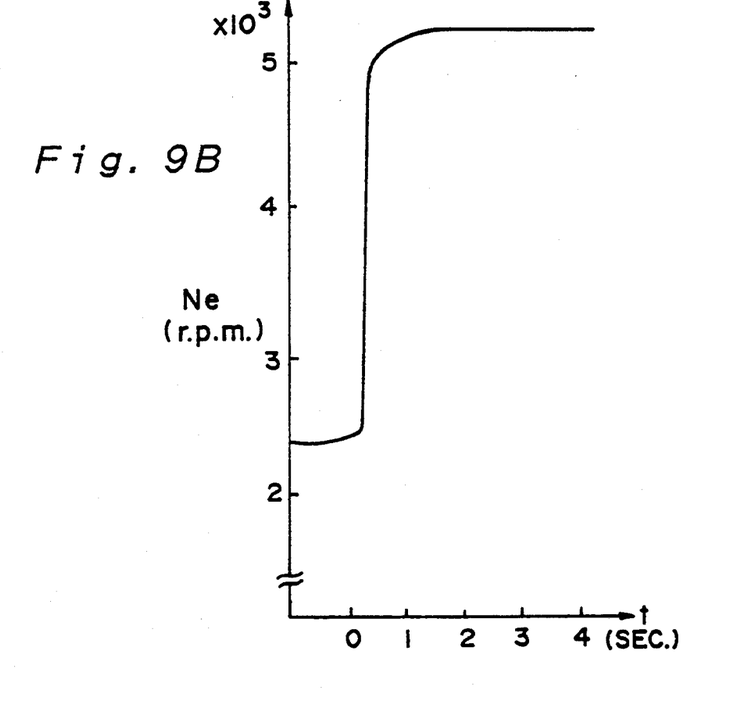

For this reason, in case the rate of gear change is too high at the time of kickdown gear shifting, there occurs a negative acceleration $\alpha$. In this case, the acceleration (G) to be applied onto the vehicular body and the engine speed (Ne) are varied as shown in, for example, FIGS. 9A and 9B, respectively. Thus, a negative acceleration (deceleration) is generated at the initial stage of kickdown gear shifting, which results in a sharp rise of engine speed.

However, the kickdown gear ratio control is performed with a view to increasing the transmission gear ratio so as to respond to the driver's desire for acceleration to thereby enhance the driving experience. Accordingly, it is not desirable in this case to generate such a deceleration even though it is a passing phenomenon.

To this end, the rate of gear change di/dt is generally to be set so that the acceleration $\alpha$ represented by expression (7) does not exhibit a negative value.

Figure 10A:
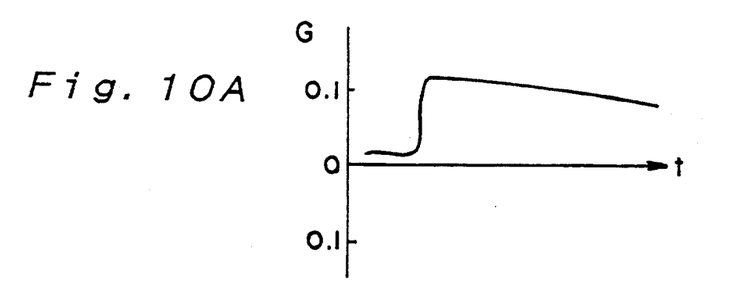
FIG. 10 is a graph illustrating the variations, correspondingly at the time of kickdown gear shifting, in the acceleration acting on the vehicular body and in the engine speed.
Figure 10B:
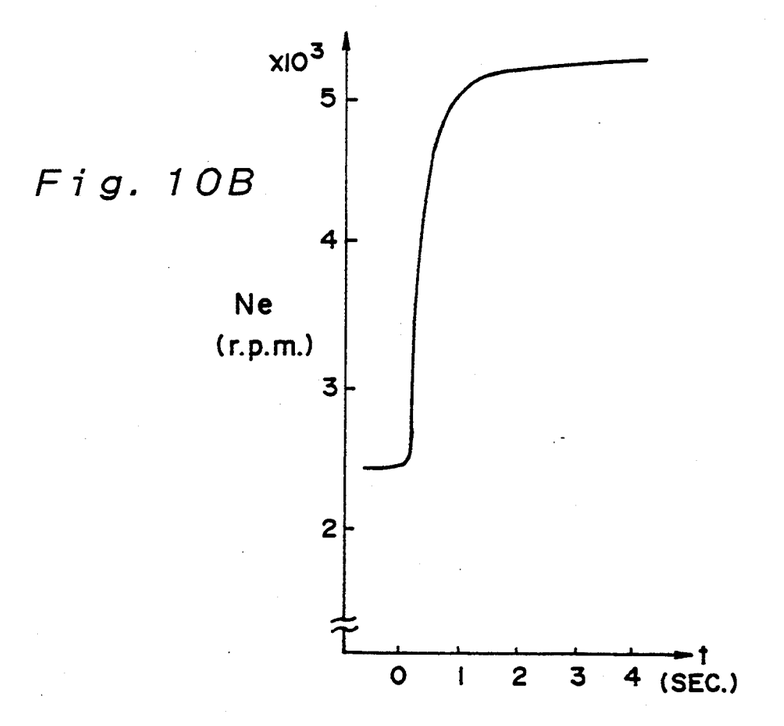

Such setting ensures that the acceleration (G) exerted on the vehicular body and the engine speed (Ne) are varied as shown in, for example, FIGS. 10A and 10B, respectively. Thus, engine speed is allowed to relatively smoothly rise without being subjected to any negative acceleration at the time of kickdown gear shifting.

In order to ensure a rapid response to the driver's desire for acceleration during the gear ratio control as described above, the rate of gear change di/dt is preferably set in such a manner that the acceleration $\alpha$ represented by expression (7) presents the largest value available within the positive range thereof. By virtue of such setting, at the kickdown gear shifting, the engine speed Ne can reach the target speed Neo in the shortest period of time without subjecting the vehicular body to any deceleration, thus realizing rapid kickdown gear ratio control.

Nevertheless, such setting of the rate of gear change may bring about an uncomfortable traveling feeling under circumstances when less variation in the traveling condition occurs as is often the case during constant-speed traveling on suburban roads or the like, because of a sensitive response of the engine speed relative to a slight action of the accelerator pedal.

For the purpose of avoiding such problem, it is conceivable to set the rate of gear change di/dt lower than the maximum of the acceleration $\alpha$ represented by expression (7) within the positive range thereof. However, in this case, under circumstances requiring a higher mobility, for example, when the vehicle is subjected to a lot of change in the traveling condition such as when traveling on mountainous or winding roads, the change in the engine speed is disadvantageously insensitive relative to the action of the accelerator pedal or the like, and hence the traveling condition having a higher mobility capable of responding to such variation in traveling condition is not to be excepted.

Also, when executing a kickdown gear shifting during the traveling at a higher engine speed, the same rate of gear change may bring about a larger gain in the engine speed as compared with the kickdown at the lower engine speed. For this reason, there arises a problem that the increase of the vehicular speed seems to the driver to be slow as compared with the rise in the engine speed, which may impart to the driver a feeling of idle running of tile engine.

Moreover, such kickdown gear ratio control is carried out with the rate of gear change which has been set as described above until the actual engine speed is correspondent with the target engine speed. Therefore, the engine speed is sharply increased before the actual engine speed approaches target engine speed, whereas the rate of rise in the engine speed is sharply lowered when the actual engine speed ultimately approaches the target engine speed.

Thus, at the time when reaching in tile intimate vicinity of the target engine speed, a kinetic energy hitherto being continuously applied to the inertia weight of the engine and the associated members during the sharp increase of the engine speed is directed to the inertia weight of the vehicular body and the associated members, to thereby bring about a rapid increase in the vehicular accelerations. Then, the driver may adversely feel such acceleration to be a shock. Under the circumstances having less variation in the traveling condition such as a constant-speed traveling conition on suburban roads, in particular, such acceleration may be felt as a shock more frequently by the driver, as compared with the circumstances requiring a higher mobility such as traveling on a mountainous roads, meandering roads or the like.

Also, in the case of the control in which the rate of the rise in the engine speed is sharply lowered when the actual engine speed approaches the target engine speed to thereby cause the actual engine speed to correspond to the target engine speed, there is often seen an overshoot condition where the actual engine speed exceeds the target engine speed. In case of the overshoot, it must be compensated for the recovery. However, this compensation may possibly lead to an undershoot. Furthermore, the occurrence of alternating overshoot and undershoot conditions may bring about a hunting in the revolution of the engine.

SUMMARY OF THE INVENTION

The present invention was conceived in view of a variety of problems arising from the kickdown gear ratio control described above, of which an object is to provide a method of controlling the gear ratio in which the kickdown gear ratio is controlled in compliance with the driver's demand for acceleration or deceleration.

In order to accomplish the above object, the present invention basically controls a transmission gear ratio based on a difference between the actual engine speed and the target engine speed to be set in response to the first indicator representative of the driver's desire for acceleration or deceleration while presetting the change characteristics of the transmission gear ratio at the time of controlling the transmission gear ratio. More specifically, a plurality of change characteristics of the transmission gear ratio are set for kickdown gear shifting, any change characteristic is selected from among the plurality of change characteristics of the transmission gear ratio in response to a second indicator representative of a driver's demand for acceleration or deceleration, and a speed ratio control of the continuously variable transmission for automotive vehicles is executed in compliance with the thus selected change characteristic of the transmission gear ratio.

The second indicator may be shift ranges to be set through the operation of a manual shift lever, traveling modes to be set through the operation of a manual changeover switch, accelerator openings, rates of change in the accelerator openings, or engine intake vacuum pressures. The second indicator is determined correspondingly to at least any one of them.

When either a general traveling characteristic or a high-mobility traveling characteristic, ensuring a higher mobile traveling than the general traveling characteristic, can be switchingly selected according to the changeover of the shift ranges or the traveling modes described above, the change characteristic in the transmission gear ratio to be set when selecting the high-mobility traveling characteristic preferably presents a characteristic including a higher rate of change of the transmission gear ratio relative to the same engine speed, as compared with the change characteristic of the transmission gear ratio to be set when selecting the general traveling characteristic.

In this case, when a region where the rate of change in the transmission gear ratio is substantially zero is set within an area presenting a higher engine speed as the change characteristic of the transmission gear ratio, the region where the rate of change in the transmission gear ratio is substantially zero is preferably more widely provided in the case of selection of the general traveling characteristic than in the case of the selection of the high-mobility traveling characteristic.

BRIEF DESCRIPTION OF THE DRAWINGS

The object and advantages of the present invention will become more apparent, when viewed in conjunction with the following drawings, in which.

DESCRIPTION OF THE PREFERRED EMBODIMENTS

A preferred exemplary embodiment of the present invention will now be described with reference to the accompanying drawings.

Figure 1:
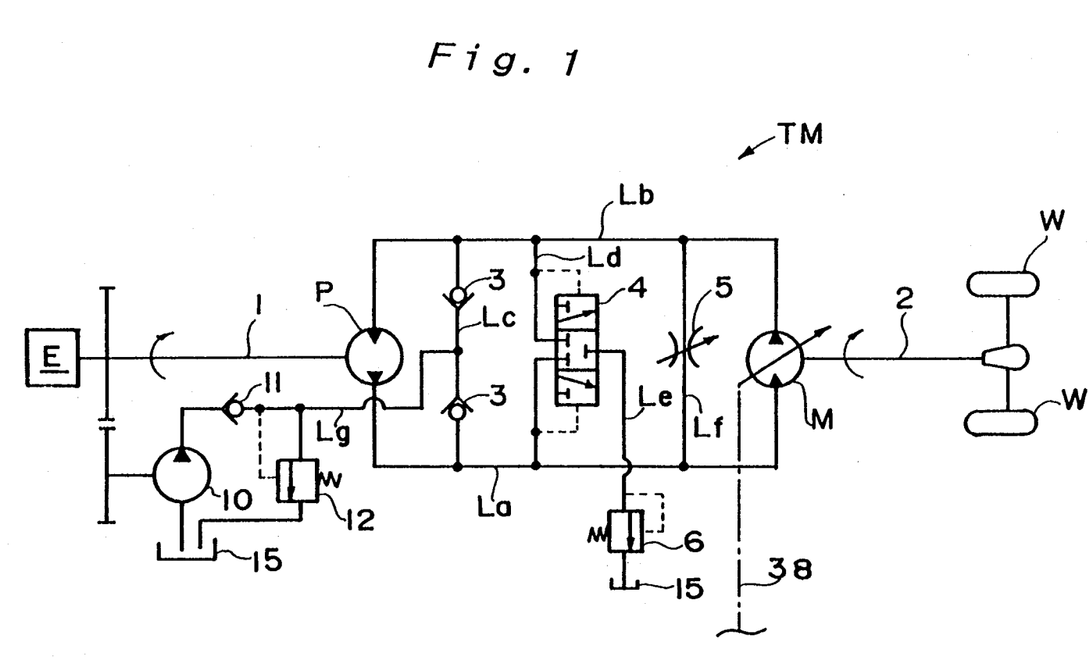
FIG. 1 is a hydraulic circuit diagram illustrating a construction of a hydraulic continuously variable transmission whose gear ratio is controlled by a method in accordance with the present invention.

Referring first to FIG. 1, there is shown a hydraulic continuously variable transmission (CVT) adapted to undergo a gear ratio control in accordance with a method of the present invention. This hydraulic continuously variable transmission generally designated at TM comprises a constant discharge type hydraulic pump P driven by an engine E through an input shaft 1, and a variable displacement hydraulic motor M including an output shaft 2 driving a pair of wheels. The above-mentioned pump P and motor M are connected with each other to form a hydraulic closed circuit by way of a first hydraulic fluid passage La through which the exhaust port of the pump P communicates with the entrance port of the motor M, and a second hydraulic fluid passage Lb through which the exhaust port of the motor M communicates with the entrance port of the pump P.

Thus, when the pump P is driven by the engine E, the hydraulic fluid forced out through the exhaust port of the pump P is transferred via the first hydraulic fluid passage La to the motor M for the rotational movement of the motor M, and then returned to the pump P via the second hydraulic passage Lb. In this case, the hydraulic pressure within the first hydraulic passage La is high, while the hydraulic pressure within the second hydraulic passage Lb is low. On the contrary, when an engine brake is caused by the driving force from the wheels W as is the case in the deceleration of automobiles, the hydraulic pressure within the first hydraulic passage La is low while the hydraulic pressure within the second hydraulic passage lb is high, though the direction of the flow of the hydraulic fluid is the same as the foregoing.

On the other hand, the exhaust port of a charging pump 10 driven by the engine E is connected with the hydraulic closed circuit by way of a charging hydraulic fluid passage Lg provided with a check valve 11, and a third hydraulic fluid passage Lc provided with a pair of check valves 3, 3. The hydraulic fluid pumped up from a tank 15 with the aid of the charging pump 10 and having a pressure controlled by a charging pressure relief valve 12 is supplied to the hydraulic fluid passage exhibiting a lower pressure between the above-mentioned two hydraulic fluid passages under the influence of the check valve 3.

Moreover, a hydraulic fluid passage Ld having a shuttle valve 4 and a hydraulic fluid passage Lf having a clutch 5 are interposed between the first and the second hydraulic fluid passages La and Lb. The shuttle valve 4 functions to connect the hydraulic fluid passage exhibiting a lower pressure between the hydraulic fluid passages La and Lb, via a hydraulic fluid passage Le, with a lower pressure relief valve 6 through which the hydraulic fluid is allowed to return to the tank 15.

While on the contrary, the clutch 5 acts as a valve for controlling the opening of the hydraulic fluid passage Lf. When the hydraulic fluid passage Lf is opened by virtue of the valve, the first and the second hydraulic fluid passages are short-circuited, and consequently the hydraulic fluid discharged from the pump P is permitted to flow through this short-circuited hydraulic fluid passage Lf, and is not transferred to the motor M. Thus, a clutch control of the transmission TM can be accomplished through the control of the opening of the clutch 5.

The hydraulic motor M may be, for example, a swash-plate type axial plunger motor which allows the angle of inclination of the swash plate to be varied for the control of the capacity thereof. Herein, the swash-plate of the motor M is linked with a variable speed servo unit 30 shown in FIG. 2 by way of a linkage mechanism 38. Thus, the variable speed servo unit 30 is used to variably control the capacity of the variable displacement motor M, thereby ensuring a variable control of the gear ratio (=revolution speed of the input shaft 1/revolution speed of the output shaft 2) of the transmission TM.

Figure 2:
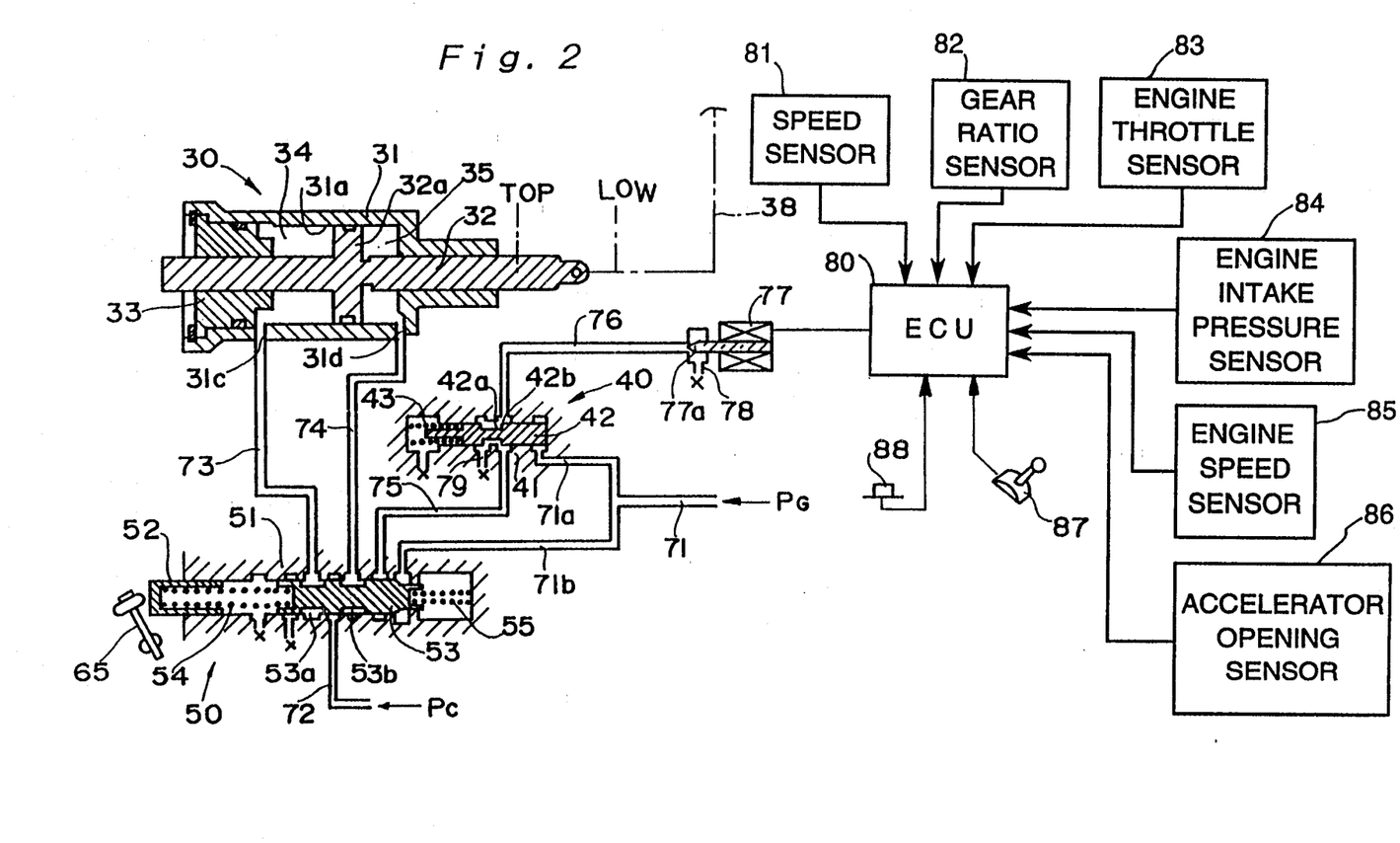
FIG. 2 is a hydraulic circuit diagram illustrating a gear ratio controlling device used for the hydraulic continuously variable transmission whose gear ratio is controlled by a method in accordance with the present invention.

Referring next to FIG. 2, description will be made of the variable speed servo unit 30 hereinbelow. The unit 30 comprises a cylinder 31, and a piston rod 32 which is slidably received transversely in the drawing within a cylinder bore 31a provided in the cylinder 31. One open end of the cylinder bore 31a is closed by a plug 33 with the piston rod 32 inserted thereinto, and the interior space of the cylinder bore 31a is separated into two sections by a piston portion 32a of the piston rod 32 under such state, to form left and right hydraulic fluid chambers 34 and 35. The cylinder 31 includes ports 31c and 31d opening into the left and right hydraulic fluid chambers 34 and 35, respectively, through which the hydraulic fluid exhibiting a predetermined hydraulic pressure is alternately drawn into or forced out from their respective hydraulic fluid chambers 34 and 35, thereby causing the piston rod to move transversely.

The piston rod 32 is linked with a capacity variable member (for example, a swash-plate) of the motor M by way of the linkage mechanism 38, thus effecting the variable control of the capacity of the motor M through the transverse movement of the piston rod 32. In this embodiment, the rightward movement of the piston rod 32 causes a larger transmission gear ratio, in other words, a shift toward LOW side, while the leftward movement brings about a smaller gear ratio, that is, a shift toward TOP side. Although not shown in this embodiment, within the linkage mechanism 38 there may be arranged a servo mechanism which amplifies the moving force of the piston rod 32 for the transmission.

The ports 31c and 31d are linked with hydraulic lines 73 and 74, respectively, which are in turn associated with a variable speed control valve 50. The variable speed control valve 50 comprises a housing 51; a first and a second spools 52 and 53 facing each other with a first spring 54 interposed therebetween and transversely slidably received within the housing 51; and a second spring 55 biasing the second spool 53 leftward.

The leftmost end of the first spool 52 abuts against a throttle cam 65 which confers on the first spool 52 a rightward biasing force corresponding to a throttle opening. Thus, the second spool 53 is subjected to a rightward pressing force (referred to as a first pressing force) corresponding to a throttle opening (in other words, an amount by which an accelerator pedal is depressed) by way of the first spring 54. On the contrary, the rightmost end of the second spool 53 is subjected to a governor pressure PG transmitted by way of a hydraulic fluid passage 71b and corresponding to an engine speed. The second spool 53 is also subjected to a leftward pressing force (referred to as a second pressing force) including a biasing force of the second spring 55 and a hydraulic force corresponding to the governor pressure PG. The transverse movement of the second spool 53 is thus positioned in accordance with a difference between the first pressing force and the second pressing force.

The second spool 53 includes grooves 53a and 53b which allow a hydraulic fluid passage 72 adapted to receive a control hydraulic pressure Pc depending on the transverse movement thereof to communicate with either of the hydraulic fluid passages 73 and 74 opening into the ports 31c and 31d, respectively. When the first pressing force is balanced with the second pressing force where the second spool 53 is positioned as shown in the drawing, the hydraulic fluid passages 72, 73, and 74 are all closed by the variable speed control valve 50, and hence the piston rod 32 is kept at a standstill at that point while leaving the gear ratio as it is.

Meantime, when the first pressing force becomes larger than the second pressing force due to the depression of the accelerator pedal or the like, the second spool 53 is moved rightward to permit a communication between the hydraulic fluid passages 72 and 73 as well as a communication between the hydraulic passages 74 and 75 by way of the groove 53b. This causes the control hydraulic pressure Pc to be supplied into the left-hand hydraulic fluid chamber 34, and the hydraulic fluid existing within the right-hand hydraulic fluid chamber 35 to be discharged, thereby moving the piston rod 32 rightward to increase the gear ratio (or to undergo a gear change toward LOW side).

On the contrary, when the second pressing force becomes larger than the first pressing force, the second spool 53 is moved leftward, thereby permitting a communication between the hydraulic fluid passages 72 and 74 through the groove 53b, and a communication between the hydraulic fluid passage 73 and a drain through the groove 53a. This allows the control hydraulic pressure Pc to be imparted into the right-hand hydraulic fluid chamber 35, and the hydraulic fluid existing within the left-hand hydraulic fluid chamber 34 to be discharged, thus moving the piston rod 32 leftward to decrease the gear ratio (or to undergo a gear change toward TOP side).

In the above operation, the first pressing force is regarded as a pressing force corresponding to a target engine speed which is a first indicator representative of a driver's accelerating or decelerating desire, while the second pressing force is considered to be one corresponding to an actual engine speed. Consequently, the gear ratio is controlled depending on the difference between the target engine speed and the actual engine speed in such a manner that the difference becomes smaller.

In the execution of such speed ratio control, a gain in the rate of change of the transmission gear ratio is constant when the gear ratio is controlled to be lowered (to be changed toward TOP side) due to a larger second pressing force, whereas the amount of discharged (or drained) hydraulic fluid is controlled through the hydraulic fluid passage 75 to adjust the gain in the rate of the change of the gear ratio, or the gear change speed depending on the engine speed or the like when the gear ratio is controlled to be heightened (to be changed toward LOW side) due to a larger first pressing force.

A discharge hydraulic fluid passage 75 is linked with a drain control valve 40 generally designated at 40, and further linked with a hydraulic fluid passage 76 having at its one end a solenoid valve 77. The drain control valve 40 includes a spool 42 received within a housing 41 so as to be transversely displaceable, and a spring 43 for urging the spool 42 rightward.

The rightmost end of the spool 42 is subjected to a governor pressure PG corresponding to the engine speed by way of hydraulic fluid passages 71 and 71a. Accordingly, when the governor pressure PG is small with an engine speed not more than the predetermined speed, the spool 41 is caused to move rightward under the influence of the spring 43, and the hydraulic fluid passage 75 fully opens into a drain hydraulic fluid passage 79 by way of a groove 42a.

Figure 3A:
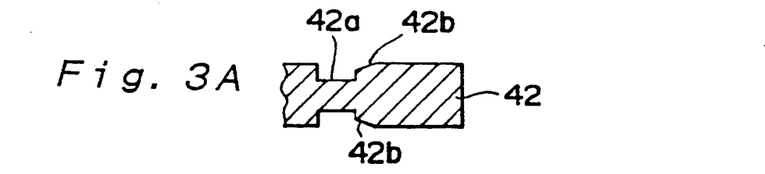
FIG. 3a and FIG. 3b are a sectional view and a top plan view, respectively, of a spool for a drain control valve constituting the above controlling device.
Figure 3B:
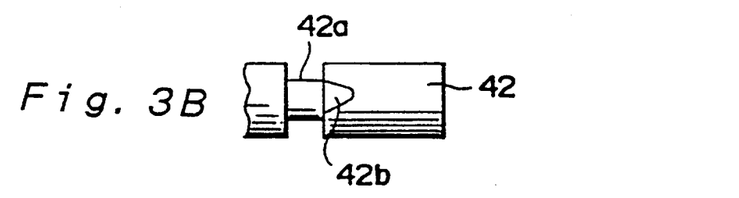

On the contrary, the engine speed above the predetermined speed assists the governor pressure PG to overcome the force of spring 43, thereby moving the spool 42 leftward. Consequently, an opening allowing the communication between the hydraulic fluid passage 75 and the drain hydraulic fluid passage 79 is defined only by a tapered notch 42b as shown in FIGS. 3(A) and 3(B), which is extremely small (substantially nil).

Figure 4:
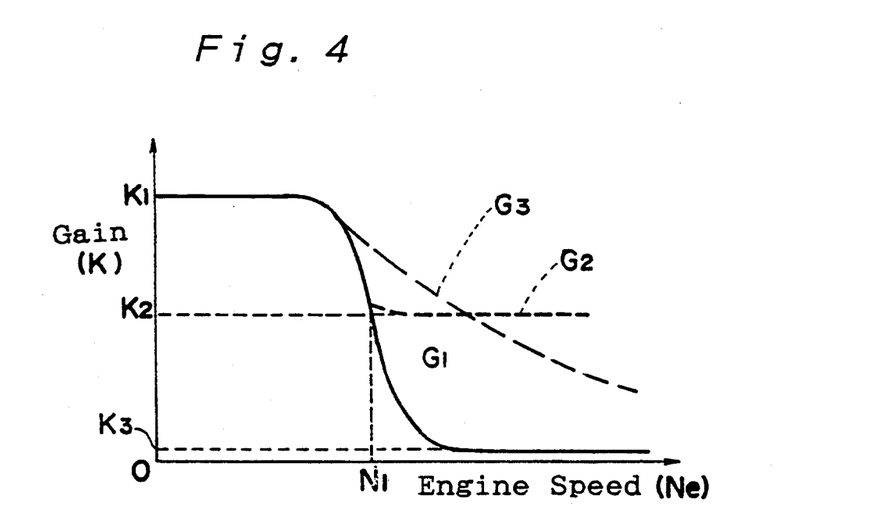
FIG. 4 is a graph representing a relationship between the gain in the rate of change in the transmission gear ratio, and the engine speed.

As a result, in the case where the gear ratio is controlled to be increased (to be shifted toward LOW side), the amount of the hydraulic fluid discharged (or drained) through the hydraulic fluid passage 75 is relatively large with the engine speed not more than the predetermined value, and becomes substantially zero with the engine speed above the predetermined value. This amount of discharged hydraulic fluid is proportional to the speed of travel of the piston rod 32, that is, the gain in the rate of change of the gear ratio. The gain in the rate of change of the gear ratio is also large with the engine speed not more than the predetermined value, and becomes substantially zero with the engine speed exceeding the predetermined value. FIG. 4 illustrates such a relationship between the gain and the engine speed, in which the gain presents a large value (K1) with the engine speed not more than the predetermined engine speed N1, and rapidly falls in the vicinity of N1, and presents an extremely small value (KS which is nearly equal to 0), as clearly shown in a solid line G1.

It is to be noted that the foregoing change in the gain represents the change in disregard of the presence of the hydraulic fluid passage 76, and that the gain is actually influenced also by the discharge of the hydraulic fluid by way of the hydraulic fluid passage 76. The hydraulic fluid passage 76 is at the one end thereof provided with the solenoid valve 77 having a valve body 77a adapted to open or close the opening located at the extremity of the hydraulic fluid passage 76.

When the solenoid valve is controlled through the activation thereof to move the valve body 77a rightward, the opening at the extremity of the hydraulic passage 76 is opened to allow the discharge of the hydraulic fluid from the hydraulic fluid passage 76 by way of the drain hydraulic passage 78. On the contrary, the leftward movement of the valve body 77a causes the opening at the extremity of the hydraulic fluid passage 76 to be gradually closed to gradually lessen the discharge of the hydraulic fluid from the hydraulic fluid passage 76.

Such activation and control of the solenoid valve 77 are executed on the basis of control signals sent forth from a control unit 80. As apparent from this fact, the amount of hydraulic fluid discharged through the hydraulic fluid passage 76 can be controlled by means of the control unit 80.

It is to be appreciated that the maximum amount of the hydraulic fluid discharged through the hydraulic fluid passage 76, in other words, the amount of the hydraulic fluid released through the fully opened opening at the extremity of the hydraulic fluid passage 76, is so set as to be considerably less than the amount of the hydraulic fluid discharged through the drain hydraulic fluid passage 79 when the spool 42 of the drain control valve 40 is moved rightward.

Thus, when the engine speed not more than the predetermined speed N1 causes the spool 42 of the drain control valve 40 to move rightward to discharge the hydraulic fluid into the drain hydraulic fluid passage 79, most of the hydraulic fluid released through the hydraulic fluid passage 75 is forced to flow into this drain hydraulic passage 79. In this case, the control of the amount discharged from the hydraulic fluid passage 76 through the activation and control of the solenoid valve 77 hardly influences the total amount discharged from the hydraulic fluid passage 75, and the gain in the rate of change of the gear ratio substantially keeps K1 without exhibiting any remarkable fluctuation.

However, when an engine speed exceeding the predetermined speed N1 causes the spool 42 of the drain control valve 40 to move leftward to substantially shut off the discharge into the drain hydraulic fluid passage 79, the amount of the hydraulic fluid discharged from the hydraulic fluid passage 76, which is determined depending on the control through the activation of the solenoid valve 77, has a great effect on the total amount discharged from the hydraulic fluid passage 75. Thus, in this case, the gain in the rate of change of the gear ratio can be controlled through the activation and control of the solenoid valve 77.

Through such control, the amount of the hydraulic fluid discharged from the hydraulic fluid passage 76 can be controlled so as to be unvaried to exhibit a constant gain K2 as shown by the short dotted line G2 in FIG. 4, for example, when the engine speed exceeds the predetermined speed N1. Moreover, the discharge of the hydraulic fluid from the hydraulic fluid passage 76 may be gradually throttled in response to the increase of the engine speed, to thereby gradually lower the gain K as shown by the long dotted line G3 in FIG. 4.

Herein, a control unit 80 which produces control signals for setting the gain, as shown in FIG. 2, receives speed signals V detected by a speed sensor 81; transmission gear ratio signals i detected by a transmission gear ratio detection sensor 82; throttle opening signals detected by an engine throttle opening sensor 83; engine intake depression signals Pdb detected by a pressure sensor 84; engine speed signals Ne detected by a engine speed sensor; accelerator opening signals AP detected by an accelerator opening sensor 86; shift range signals RP detected by a shift lever position sensor 87; and traveling mode signals sent forth from a mode changeover switch 88. In response to these signals, the activation and control signals for the solenoid valve 77 is output from the control unit 80.

In this embodiment, a plurality of gain characteristics in the rate of change of the gear ratio (characteristics of the change in the gear ratio) appearing in the process of kickdown gear change are preset to select the predetermined gain characteristic from thereamong based on a second indicator representing a travel demand of the driver. The kickdown gear ratio control is executed in compliance with the thus selected characteristic.

Figure 5:
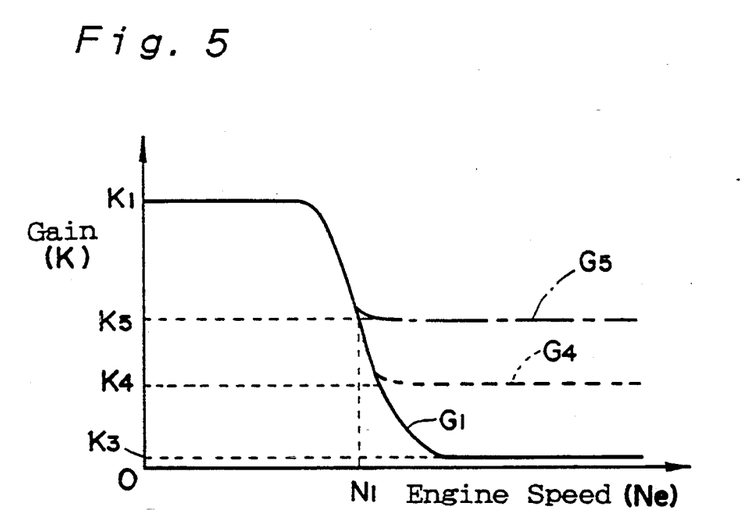
FIG. 5 is a graph representing a relationship between the gain in the rate of change in the transmission gear ratio, and the engine speed.

More specifically, a gain characteristic G4 by which the gain constantly exhibits K4 in the region exceeding the predetermined engine speed N1 as shown in the dotted line in FIG. 5, and a gain characteristic G5 by which the gain constantly exhibits K5 in the region beyond the predetermined engine speed N1 as shown in the alternate long and short dash line, for example, are previously set to undergo an appropriate selection therebetween in accordance with the second indicator, thus executing the control of the kickdown gear change.

The second indicator may be, for example, a shift range. The driver presumably demands a relatively gentle travel or a general travel characteristic when the shift range lies within range D (where a shift lever is located at position D), while he or she possibly demands a brisk and highly mobile travel or a high-mobile travel characteristic when the shift range points to range L (where the shift lever rests on position L). Accordingly, the gear change characteristics are so set that the travel characteristics can correspond to these demands.

Figure 6:
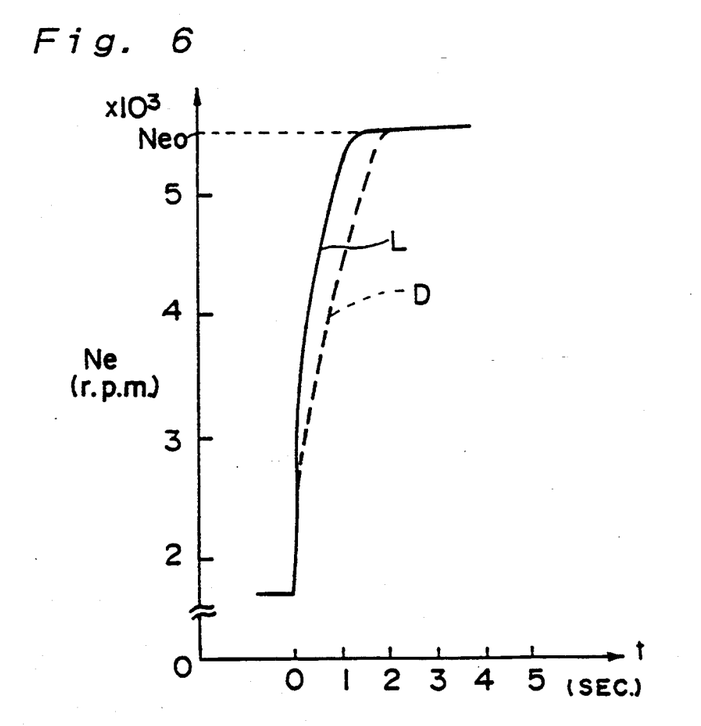
FIG. 6 is a graph representing the variation in the engine speed at the time of kickdown gear shifting.

In this embodiment, the gain characteristic G4 is designed to be selected providing the range D is designated, whereas the gain characteristic G5 is selected with the designation of the range L. As a result, the execution of the kickdown gear shifting in the range L allows a relatively large gain K5 to be set, and the engine speed at the time of the gear change to rapidly approach a target engine speed Neo as clearly shown by the solid line L in FIG. 6. On the other hand, the execution of the kickdown gear shifting in the range D permits the gain K4 less than the gain K5 produced in the range L to be set, and the engine speed during the gear change to gently come nearer to the target engine speed Neo as shown by the dotted line D in FIG. 6.

Figure 7:
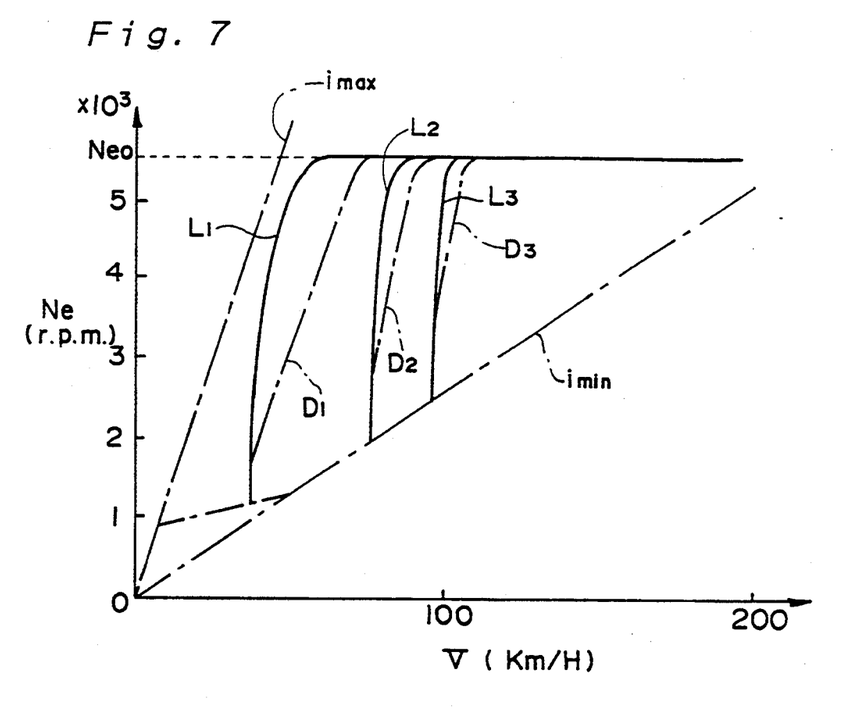
FIG. 7 is a graph representing the variations in the engine speed and the transmission gear change at the time of kickdown gear shifting.

FIG. 7 shows the actual transmission gear ratio and the change in the engine speed under the influence of such control, in which the ordinate axis represents engine speeds and the abscissa axis depicts speeds of an automotive vehicle. The ordinate axis corresponds to transmission input revolutions while the abscissa axis corresponds to transmission output revolutions. Thus, the gradient of the straight line extending from the origin signifies a transmission gear ratio i which is controlled to vary within the range of i max and i min.

This drawing shows the result of the gear ratio control performed when the accelerator pedal is depressed opening fully closed condition until the engine throttle is entirely opened during the travel. As described hereinabove, the ranges D and L employ different gain characteristics. Accordingly, the result of the gear ratio control indicates that the changes in the range D (changes delineated by the alternate long and short dash lines D1, D2, and D3) is somewhat gentler than those in the range L (changes pictured by the solid lines L1, L2 and L3) as is seen from the drawing.

Through the execution of the above-described control, the gear change response characteristic with respect to the operation of the accelerator in the range L requiring a high mobility traveling characteristic can be improved. Thus, in the case of travel requiring a higher mobility such as travel along mountainous roads, winding roads or the like, the range L may be employed which presents a higher gear change response characteristic with respect to the operation of the accelerator at the time of kickdown, thereby ensuring a kickdown gear change control in compliance with the high-mobility traveling characteristic.

On the contrary, the range D, requiring a general traveling characteristic, presents a gentle gear change response characteristic with respect to the operation of the acceleration at the time of kickdown. Thus, in the case of travel subjected to less fluctuation of the traveling condition such as constant speed travel along suburban roads or the like, the adoption of the range D is effective in that a fluctuation of the engine speed extremely sensitive to a minute operation of the accelerator pedal can be suppressed, thereby realizing a noiseless and stable traveling condition in accordance with the general traveling characteristics.

The above description has been made of the case where the shift range is used as the second indicator representative of the driver's demand for the travel. However, the present invention is not intended to be limited to this, and the following may be used as the second indicator.

For example, the second indicator may be a mode changeover switch which is capable of being switched by the driver. The mode changeover switch functions to select either an economy mode requiring a general traveling characteristic or a sporting mode requiring a high-mobility traveling characteristic. Thus, when set at the economy mode, the gain characteristic G4 is selected in FIG. 5, while when set at the sporting mode, the gain characteristic G5 is selected.

Furthermore, as the second indicator there may be used an accelerator opening $\theta AP$, a rate of change in the accelerator opening $\theta AP$, a throttle opening $\alpha th$, a rate of change in the throttle opening $\theta th$, engine intake pressure Pb, and a rate of change in the engine intake pressure Pb. More specifically, for example, a smaller rate of change in the accelerator opening $\theta AP$ is considered as a demand for the general traveling characteristic to select the gain characteristic G4 in FIG. 5, while a larger rate of change in the accelerator opening $\theta AP$ is regarded as a demand for the high-mobility traveling characteristic to select the gain characteristic G5 in FIG. 5.

When setting the gain characteristics at the time of kickdown (or the characteristics of change in the transmission gear ratio) as described above, the gain K may be possibly substantially zero, in other words, the transmission gear ratio may be possibly substantially unchanged in the region presenting a higher engine speed.

This prevents the engine speed from being excessively raised when the kickdown gear shifting is carried out during the travel at a higher engine speed because the change of the engine speed is sharper than that of the transmission gear ratio in the higher engine speed region. This further prevents the driver from undergoing a feeling of racing as the increase in the vehicle speed seems to be gentler than that in the engine speed.

In the region where the gain is substantially zero, the rise of the engine speed in response to the amount of the depression of the accelerator pedal is only produced while keeping the transmission gear ratio constant with respect to the depression of the accelerator pedal. Thus, this region is to be set based on the second indicator representing the driver's demand for the travel since the gear change response characteristics relative to the operation of the accelerator pedal is lowered in this region.

Figure 8:
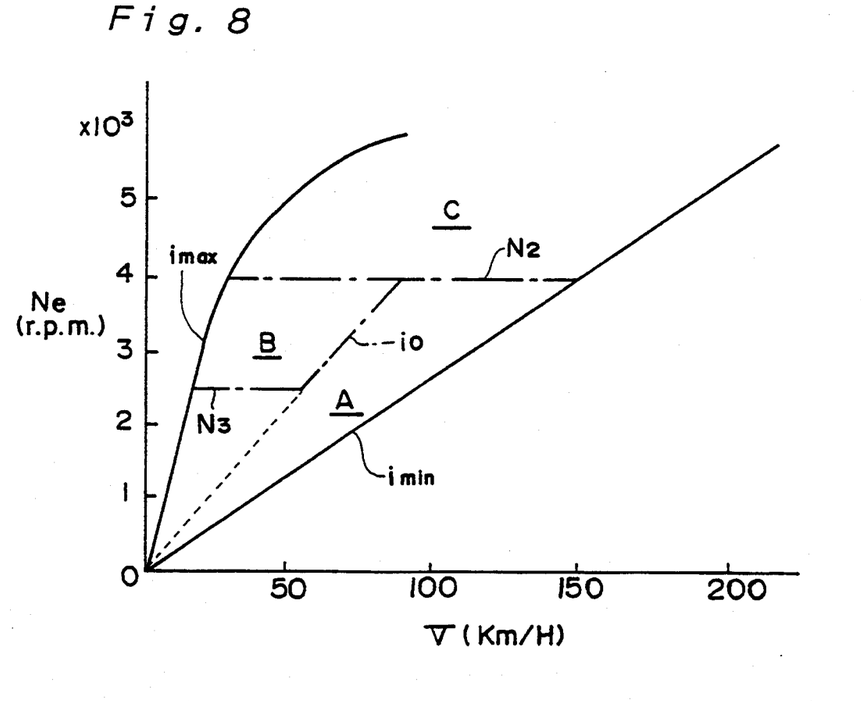
FIG. 8 is a graph illustrating a region where the gain is substantially zero when setting gain characteristics of the rate of change in the transmission gear ratio.

More concretely, when the second indicator is aiming at the general traveling characteristic, for example, the D range is set, the gain characteristic by which the gain K presents substantially zero in the regions B and C in FIG. 8 is selected. Thus, the gain K presents zero in the region B where the transmission gear ratio is larger than the predetermined transmission gear ratio io and the engine speed is greater than N3, and the region C where the engine speed is larger than N2.

While on the contrary, when setting the second indicator is aiming at the high-mobility traveling characteristic, for example, the L range, there is selected the gain characteristic by which the gain K is substantially zero only in the region C in FIG. 8. Thus, the gain K presents zero only in the region C where the engine speed is larger than In other words, through this control, the gain characteristic (or the characteristic of change in the transmission gear ratio) to be selected when the second indicator intended for the general traveling characteristic is set, includes a more widely set region where the gain is substantially zero, as compared with the gain characteristic to be selected when setting the second indicator intended for the high-mobility traveling characteristic.

The above-described setting ensures not only a noiseless and stable traveling condition in the general traveling characteristic, but also a highly mobile traveling condition in the high-mobility traveling characteristic.

Hereinbefore, the description has been made of the case of the hydraulic continuously variable transmission, by way of example. The present invention is, however, not limited to this, and it will be obvious to those skilled in the art to be also applicable to the other types of continuously variable transmissions.

Moreover, this embodiment employs a solenoid valve as a means of controlling the gain of the rate of change in the transmission gear ratio. Nevertheless, the present invention is not intended to be confined to such construction, and any means capable of controlling the amount of the hydraulic fluid is applicable regardless of its construction. Additionally, there may be used a means to directly control the traveling speed of the piston rod in the servo unit, instead of controlling the amount of hydraulic fluid to be drained as described above.

What is claimed is:

1. A method of controlling speed reduction ratios of a continuously variable transmission for automotive vehicles during a kickdown shifting in which a transmission speed reduction ratio is controllable based on a difference between an actual engine speed and a target engine speed to be set in response to a first parameter corresponding to an accelerator opening, comprising the steps of:

setting a plurality of change characteristics of the transmission speed reduction ratio for kickdown shifting, each of said change characteristics respectively having a different rate of change in the transmission speed ratio;

selecting a change characteristic from among said plurality of change characteristics of the transmission speed reduction ratio in response to a second parameter representative of a driver's demand for acceleration during traveling; and executing a speed reduction ratio control of said continuously variable transmission for automotive vehicles using said selected change characteristic of the transmission speed reduction ratio during a kickdown shifting.

2. A method of controlling speed reduction ratios of a continuously variable transmission for automotive vehicles according to claim 1, wherein said continuously variable transmission includes a hydraulic pump driven by an engine, and a hydraulic motor which drives wheels of the automotive vehicle and is driven by the hydraulic power produced by said hydraulic pump, and wherein the method further comprises variably controlling the capacity of at least one of said hydraulic pump and said hydraulic motor to effect the speed reduction ratio control.

3. A method of controlling speed reduction ratios of a continuously variable transmission for automotive vehicles according to claim 1 or 2, wherein said transmission speed reduction ratio is controlled in such a manner that said actual engine speed coincides with said target engine speed.

4. A method of controlling speed reduction ratios of a continuously variable transmission for automobile vehicles according to claim 1, wherein said second parameter is determined in correspondence with a shift range to be selected by an operation of a manual shift lever.

5. A method of controlling speed reduction ratios of a continuously variable transmission for automobile vehicles according to claim 4 wherein either a shift range having a general traveling characteristic or a shift range having a high-mobility traveling characteristic can be selected by the operation of said manual shift lever, and wherein the rate of change in the transmission speed reduction ratio during kickdown shifting is higher in said high-mobility traveling characteristic than in said general traveling characteristic under a common engine speed.

6. A method of controlling speed reduction ratios of a continuously variable transmission for automotive vehicles according to claim 5 wherein said high-mobility traveling characteristic is selected when said shift range lies within a range L, while said general traveling characteristic is selected when said shift range lies within a range D.

7. A method of controlling speed reduction ratios of a continuously variable transmission for automobile vehicles according to claim 1, wherein said second parameter is determined in correspondence with a traveling mode selected by an operation of a manual changeover switch.

8. A method of controlling speed reduction ratios of a continuously variable transmission for automotive vehicles according to claim 7 wherein either a traveling mode having a general traveling characteristic or a traveling mode having a high-mobility traveling characteristic can be selected by the operation of said manual changeover switch, and wherein the rate of change in the transmission speed reduction ratio during kickdown shifting is higher in said high-mobility traveling characteristic than in said general traveling characteristic under a common engine speed.

9. A method of controlling speed reduction ratios of a continuously variable transmission for automotive vehicles according to claim 8 wherein either an economy mode adapted to select the general traveling mode or a sport mode adapted to select the high-mobility traveling characteristic is switchingly selected by means of said mode changeover switch.

10. A method of controlling speed reduction ratios of a continuously variable transmission for automobile vehicles according to claim 5 or 8 wherein
said change characteristic of the transmission speed reduction ratio is provided with a region where the rate of change in the transmission speed reduction ratio is substantially zero, within a high engine speed area, and wherein
said region in said general traveling characteristic is wider than that in said high-mobility traveling characteristic.

11. A method of controlling speed reduction ratios of a continuously variable transmission for automotive vehicles according to claim 1, wherein
said second parameter is determined in correspondence with a rate of change in said accelerator opening.

12. A method of controlling speed reduction ratios of a continuously variable transmission for automotive vehicles according to claim 1, wherein
said second parameter is determined in correspondence with a rate of change in an engine intake vacuum pressures.

13. A method of kickdown shifting ratio control in an automotive vehicle in which output of an engine is transmitted to wheels of the vehicle by way of a power transmission system including a continuously variable automobile transmission in which a transmission speed reduction ratio is continuously controllable based on a difference between an actual engine speed and a target engine speed so that the actual engine speed approaches the target engine speed without generating a negative acceleration, the method comprising the steps of
sensing a first indicator representing a driver's desire for acceleration;
setting the target engine speed in response to the first indicator;
setting a plurality of change characteristics of the transmission speed reduction ratio for kickdown shifting that the transmission will follow, each of said change characteristics respectively having a different rate of change in the transmission speed reduction ratio;
sensing a second indicator representing the driver's desire for acceleration during traveling;
selecting one of said plurality of change characteristics based on said second indicator; and
executing said kickdown shifting ratio control based on said selected change characteristic.

14. A method of kickdown shifting ratio control according to claim 13 wherein sensing said first indicator comprises sensing one of an amount of depression of an accelerator pedal and an opening of a throttle valve.

15. A method of kickdown shifting ratio control according to claim 14 wherein sensing said second indicator comprises sensing at least one of a shift range set through an operation of a manual shift lever, a traveling mode set through an operation of a manual traveling mode switch, a rate of change of an engine throttle opening, and a rate of change of an engine intake pressure.

16. A method of kickdown shifting ratio control according to claim 15 wherein said continuously variable transmission further comprises a constant discharge type hydraulic pump driven by the engine through an input shaft, a variable displacement hydraulic motor including an output shaft, wherein said hydraulic motor is a swash-plate type axial plunger motor including a variable speed servo unit linked to a swash plate of said hydraulic motor by a linkage mechanism to vary an angle of inclination of the swash plate to control the capacity of said hydraulic motor, and wherein said hydraulic pump and said hydraulic motor are connected with each other to form a hydraulic closed circuit by way of a first hydraulic fluid passage through which an exhaust port of said hydraulic pump communicates with an entrance port of said hydraulic motor, and a second hydraulic fluid passage through which an exhaust port of said hydraulic motor communicates with an entrance port of said hydraulic pump, and wherein said executing step further comprises
controlling said variable speed servo unit to thereby set a rate of change in the transmission speed reduction ratio during kickdown shifting.

17. A method of kickdown shifting ratio control according to claim 16 wherein said servo unit further comprises a cylinder and a piston rod having a piston portion fixedly mounted thereon, wherein said piston portion is slidably received in a bore in said cylinder, wherein said piston rod is connected to said hydraulic motor by said linkage mechanism, and wherein said controlling of said servo unit comprises directly controlling a travel of said piston rod.

18. A method of kickdown shifting ratio control according got claim 16 wherein said servo unit further comprises a cylinder and a piston rod having a piston portion fixedly mounted thereon, wherein said piston portion is slidably received in a bore in said cylinder and said piston portion is mounted on said piston rod so as to divide said bore into a first hydraulic fluid chamber and a second hydraulic fluid chamber when said piston portion is slidably received in said bore, and wherein said piston rod is connected to said hydraulic motor by said linkage mechanism, and wherein said controlling of said servo unit comprises.
controlling a pressure in said first hydraulic fluid chamber and controlling a pressure in said second hydraulic fluid chamber by regulating an amount of hydraulic fluid supplied to and drained from each of said first and said second hydraulic chambers, such that a pressure differential between said first chamber pressure and said second chamber pressure produces a resulting force on said piston portion that moves said piston rod to vary said capacity of said hydraulic motor wherein said movement of said piston rod sets a rate of change in the transmission speed reduction ratio during kickdown shifting.

19. A method of kickdown shifting ratio control according to claim 18 wherein said controlling of said servo unit further comprises controlling a speed of said movement of said piston rod to thereby control a rate of change in the transmission speed reduction ratio during kickdown shifting.

20. A method of kickdown shifting ratio control according to claim 19 wherein said controlling of said speed of said movement of said piston rod further comprises setting a gain characteristic according to said second indicator, and controlling said speed of movement of said piston rod in accordance with said gain characteristic.

21. A method of kickdown shifting ratio control according to claim 18 wherein said controlling of said pressure in said first hydraulic fluid chamber and in said second hydraulic fluid chamber is influenced by said first indicator and said second indicator in such a manner as to decrease said difference between said actual engine speed and said target engine speed.

22. A method of kickdown shifting ratio control according to claim 14 wherein sensing said second indicator comprises sensing one of a shift range set through an operation of a manual shift lever and a traveling mode set through an operation of a manual traveling mode switch, and wherein said second indicator represents the driver's desire for acceleration during traveling according to one of a high-mobility traveling characteristics and a general traveling characteristic.

23. An apparatus for kickdown shifting ratio control in an automotive vehicle in which output of an engine is transmitted to wheels of the vehicle by way of a power transmission system including a continuously variable automotive transmission in which a transmission speed reduction ratio is continuously controllable based on a difference between an actual engine speed and a target engine speed so that the actual engine speed approaches the target engine speed, said target engine speed being set in correspondence with a first parameter representing a driver's desire for acceleration, comprising
an actuator for continuously controlling the transmission speed reduction ratio of said continuously variable automotive transmission;
ratio control means for controlling the operation of said actuator based on said first parameter so that the actual engine speed approaches the target engine speed;
ratio change speed reduction control means for controlling an operational speed of said actuator during a kickdown shifting; and
said operational speed of said actuator being differently controlled during the kickdown shifting by said ratio change speed reduction control means in response to a second parameter representative of a driver's demand for acceleration during traveling.

24. An apparatus for kickdown shifting ratio control according to claim 23, wherein
said actuator includes a hydraulic servo unit to control the transmission speed reduction ratio;
said ratio control means includes a hydraulic ratio control valve to control a supply and discharge of hydraulic fluid to and from said hydraulic servo unit in order to control operations of said servo unit; and
said ratio change speed reduction control means includes a hydraulic flow control valve to control a flow rate of the hydraulic fluid in order to control an operational speed of said piston in said hydraulic servo unit.

25. An apparatus for kickdown shifting ratio control according to claim 24, wherein
said hydraulic flow control valve controls the discharge flow rate of the hydraulic fluid from said servo unit through said ratio control valve during the kickdown shifting.

26. An apparatus for kickdown shifting ratio control according to claim 23, 24, or 25 wherein
said continuously variable transmission includes a hydraulic pump driven by an engine, and a hydraulic motor which drives wheels of the automotive vehicle and is driven by the hydraulic power produced by said hydraulic pump, and wherein the apparatus further comprises
variably controlling the capacity of at least one of said hydraulic pump and said hydraulic motor to effect the speed reduction ratio control.

27. An apparatus for kickdown shifting ratio control according to claim 23, 24, or 25, wherein
said second parameter is determined in correspondence with a shift range to be selected by an operation of a manual shift lever.

28. An apparatus for kickdown shifting ratio control according to claim 27, wherein
either a shift range having a general traveling characteristic or a shift range having a high-mobility traveling characteristic can be selected by the operation of said manual shift lever, and wherein
the rate of change in the transmission speed reduction ratio during kickdown shifting is higher in said high-mobility traveling characteristic than in said general traveling characteristic under a common engine speed.

29. An apparatus for kickdown shifting ratio control according to claim 28, wherein
the discharge flow rate from said servo unit controlled by said hydraulic flow control valve during the kickdown shifting is higher in said high-mobility traveling characteristic than in said general traveling characteristic under a common engine speed.

30. An apparatus for kickdown shifting ratio control according to claim 27, wherein
said second parameter is determined depending on said shift ranges, and wherein
said high-mobility traveling characteristic is selected when said shift range lies within a range L, while said general traveling characteristic is selected when said shift range lies within a range D.

31. An apparatus for kickdown shifting ratio control according to claim 23, 24, or 25, wherein said second parameter is determined in correspondence with a traveling mode selected by an operation of a manual changeover switch.

32. An apparatus for kickdown shifting ratio control according to claim 31, wherein
either a traveling mode having a general traveling characteristic or a traveling mode having a high-mobility traveling characteristic can be selected by the operation of said manual changeover switch, and wherein
the rate of change in the transmission speed reduction ratio during kickdown shifting is higher in said high-mobility traveling characteristic than in said general traveling characteristic under a common engine speed.

33. An apparatus for kickdown shifting ratio control according to claim 32, wherein
the discharge flow rate from said servo unit controlled by said hydraulic flow control valve during the kickdown shifting is higher in said high-mobility traveling characteristic than in said general traveling characteristic under a common engine speed.

34. An apparatus for kickdown shifting ratio control according to claim 31, wherein
either an economy mode adapted to select the general traveling mode or a sport mode adapted to select the high-mobility traveling characteristic is switchingly selected by means of said mode changeover switch.

35. An apparatus for kickdown shifting ratio control according to claim 23, 24, or 25, wherein
said second parameter is determined in correspondence with a rate of change in said accelerator opening.

36. An apparatus for kickdown shifting ratio control according to claim 23, 24, or 25, wherein
said second parameter is determined in correspondence with a rate of change in an engine intake vacuum pressures.

37. A method of controlling speed reduction ratios of a continuously variable transmission for automotive vehicles in which a transmission speed reduction ratio is controllable based on a difference between an actual engine speed and a target engine speed to be set in response to a first parameter corresponding to an accelerator opening, comprising the steps of:
setting a plurality of change characteristics of the transmission speed reduction ratio for kickdown shifting;
selecting a change characteristic from among said plurality of change characteristics of the transmission speed reduction ratio in response to a second parameter representative of a driver's demand for acceleration during traveling, wherein said second parameter is determined in correspondence with at least one member selected from the group consisting of shift ranges to be set through the operation of a manual shift lever, traveling modes to be set through the operation of a manual changeover switch, accelerator openings, rates of change in said accelerator openings, and engine intake vacuum pressures,
wherein either a general traveling characteristic or a high-mobility traveling characteristic, ensuring a higher mobile traveling than said general traveling characteristic, is switchingly selected in correspondence with the changeover of one of said shift ranges and said traveling modes, and further wherein said change characteristic in the transmission speed reduction ratio to be set when selecting said high-mobility traveling characteristic exhibits a higher rate of change in the transmission speed reduction ratio relative to the same engine speed, as compared with the change characteristic in transmission speed reduction ratio to be set when selecting said general traveling characteristic, and still further wherein said change characteristic of the transmission speed reduction ratio is provided with a region where the rate of change in the transmission speed reduction ratio is substantially zero, within an area exhibiting a higher engine speed, and wherein said region where the rate of change in the transmission speed reduction ratio to be set when selecting said general traveling characteristic is wider than that to be set when selecting said high-mobility traveling characteristic; and
executing a speed reduction ratio control of said continuously variable transmission for automotive vehicles using said selected change characteristic of the transmission speed reduction ratio when it is decided based on the first parameter that a kickdown shifting is needed.

* * * * *